United States Patent [19]

Wanner et al.

[11] E Patent Number: Re. 31,755

[45] Reissued Date of Patent: Dec. 4, 1984

[54] TOOL AND CHUCK FOR HAMMER DRILL

[75] Inventors: Karl Wanner, Echterdingen; Klaus Voss, Stuttgart, both of Fed. Rep. of Germany

[73] Assignee: Robert Bosch GmbH, Stuttgart, Fed. Rep. of Germany

[21] Appl. No.: 162,040

[22] Filed: Jun. 20, 1980

Related U.S. Patent Documents

Reissue of:

[64] Patent No.: 4,107,949
Issued: Aug. 22, 1978
Appl. No.: 725,193
Filed: Sep. 21, 1976

[30] Foreign Application Priority Data

Nov. 14, 1975 [DE] Fed. Rep. of Germany ..... 2551125

[51] Int. Cl.[3] ..... F16D 3/06; B23B 31/06; B23B 31/16

[52] U.S. Cl. ..... 464/167; 279/1 B; 279/75

[58] Field of Search ..... 464/167, 168, 163; 279/1 B, 19, 19.3, 19.4, 22, 30, 75, 81; 173/104–111

[56] References Cited

U.S. PATENT DOCUMENTS

| | | | |
|---|---|---|---|
| 1,024,172 | 4/1912 | Bergsten | 279/81 |
| 1,861,099 | 5/1932 | Smith | 279/75 |
| 2,025,834 | 12/1935 | Tautz | 464/162 |
| 2,384,600 | 9/1945 | Cherry | 279/87 |
| 2,592,103 | 4/1952 | Alfreden | 464/167 |
| 2,823,040 | 2/1958 | Fischer | 279/19 |
| 3,118,291 | 1/1964 | Berglund | 464/167 |
| 3,210,136 | 10/1965 | Anderson | 464/168 |
| 3,279,218 | 10/1966 | Chocholek et al. | 464/167 |
| 3,443,399 | 5/1969 | Pope et al. | 464/167 |
| 3,478,541 | 11/1969 | McGill et al. | 464/168 |
| 3,759,065 | 9/1973 | Montefiore | 464/167 |
| 3,895,501 | 7/1975 | Holmes | 464/70 |

FOREIGN PATENT DOCUMENTS

| | | | |
|---|---|---|---|
| 2408557 | 9/1975 | Fed. Rep. of Germany . | |
| 2248914 | 5/1975 | France . | |
| 278062 | 12/1951 | Switzerland | 279/75 |

*Primary Examiner*—Ira S. Lazarus
*Attorney, Agent, or Firm*—Michael J. Striker

[57] ABSTRACT

A hammer drill has a chuck forming a tool receptacle defining a chuck axis and provided with a tool-holding element radially displaceable into a position protruding into the tool receptacle. The tool has a shank defining a tool axis receivable axially in the receptacle. This shank is formed with a radially outwardly opening recess closed at both axial ends and shaped to receive the tool-holding element, and with an axially extending groove separate from the recess and opening axially at the end of the shank. This groove has at least one flank extending substantially radially of the tool axis. A rotary-entrainment formation in the receptacle is formed with at least one side flatly engageable with the flank for maximum force transmission and minimum wear.

22 Claims, 11 Drawing Figures

1
8
12
9
5
7
4
10
11

1
2
A
12
13
3
2'
12'
II
8'
8
4
7
9
5
6

TOOL AND CHUCK FOR HAMMER DRILL

Matter enclosed in heavy brackets [ ] appears in the original patent but forms no part of this reissue specification; matter printed in italics indicates the additions made by reissue.

CROSS-REFERENCE TO RELATED APPLICATION

This application is related to the commonly assigned and copending patent application No. 574,715 filed May 5, 1975 (now U.S. Pat. No. 3,995,703) the entire disclosure of which is herewith incorporated by reference.

BACKGROUND OF THE INVENTION

The present invention relates to a hammer drill. More particularly this invention concerns *a tool, as well as* a chuck and tool for a hammer drill.

In a hammer drill it is necessary to secure the shank of a drill bit in the workpiece holder or chuck. The tool is axially reciprocated and rotated, so that it is necessary to allow at least limited axial displacement of the tool in the chuck, yet be able to transmit rotary motion between the chuck and the tool.

Normally the tool is simply formed with a recess that is closed at both axial ends and of part-cylindrical shape. The chuck has a normally cylindrical receptacle adapted to receive this shank and is provided with a radially inwardly engageable tool-securing element that is movable into a position in the recess. Thus this element serves not only to prevent the tool from falling axially out of the chuck, but also serves to transmit force angularly between the chuck and the tool.

A considerable disadvantage with this system is that the tool-holding element and the corresponding recess are subjected to considerable force so that they tend to wear, with the recess enlarging and the element becoming smaller. After some use, particularly when the tool is employed to drill holes in masonry and the like, the fit between the tool and the chuck becomes so very loose that it is necessary to use a new tool and/or replace the holding element.

It has been attempted to overcome this disadvantage by replacing the normally part-spherical end of the element which engages in the recess with an axially elongated cylindrical member so that a greater contact surface is obtained. Such an arrangement does increase the service-life of the combination somewhat but nonetheless leaves this element and the recess as the most wear-prone parts of the combination.

SUMMARY OF THE INVENTION

It is therefore an object of the present invention to provide *an improved tool, as well as* an improved chuck and tool combination.

Another object is the provision of such a *tool and* combination which [is] *are* particularly useable in a hammer drill, that is in a power tool wherein a drill bit or the like is rotated and reciprocated axially at the same time.

These objects are attained according to the present invention in [combination wherein the tool] *a tool which* has a recess as described above, and in addition to this recess is formed with an axially extending groove which opens axially of the end of this shank and has at least one flank which extends substantially radially of the tool axis defined by the tool shaft. The chuck [according to this invention] *for such a tool* is provided with a rotary-entrainment formation in the receptacle which is formed with at least one side flatly engageable with the flank of the groove. Thus the flank of the groove and the side of the tool engage flatly against each other in surface contact in a direction exactly perpendicular to the direction that force must be applied so that wear is reduced to an absolute minimum. Indeed in such a system it has been found that the tool normally wears out at its working end long before the shank has worn noticably.

According to further features of this invention the formation is a prismatic or polygonal-section ridge integrally formed with the chuck. This ridge may be of a trapezoidal section and have a pair of such sides engageable with the corresponding pair of sides of a trapezoidal-section groove in the tool shank. The formation and the groove are of approximately the same axial length and each of the flanks of the grooves lies in a respective plane including a tool axis.

In accordance with yet another feature of this invention, the recess, which serves merely in combination with the tool-holding element to secure the tool in the workpiece, is of round section shape. It may be formed as a circumferential groove extending completely around the shank or as a simple recess adapted to receive the part-spherical end of the tool-holding element.

Two such grooves may be provided in accordance with the present invention on diametrically opposite sides of the tool shank, and offset by a predetermined angular distance of between 45° and 90°, preferably 60°, from a pair of such recesses similarly diametrically oppositely formed in the tool shank.

According to yet another feature of this invention the tool shank is of generally cylindrical shape and has a predetermined diameter. The groove has a radial depth equal to between 0.15 and 0.25 of this diameter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

SPECIFIC DESCRIPTION OF PREFERRED EMBODIMENTS

Figure 1:
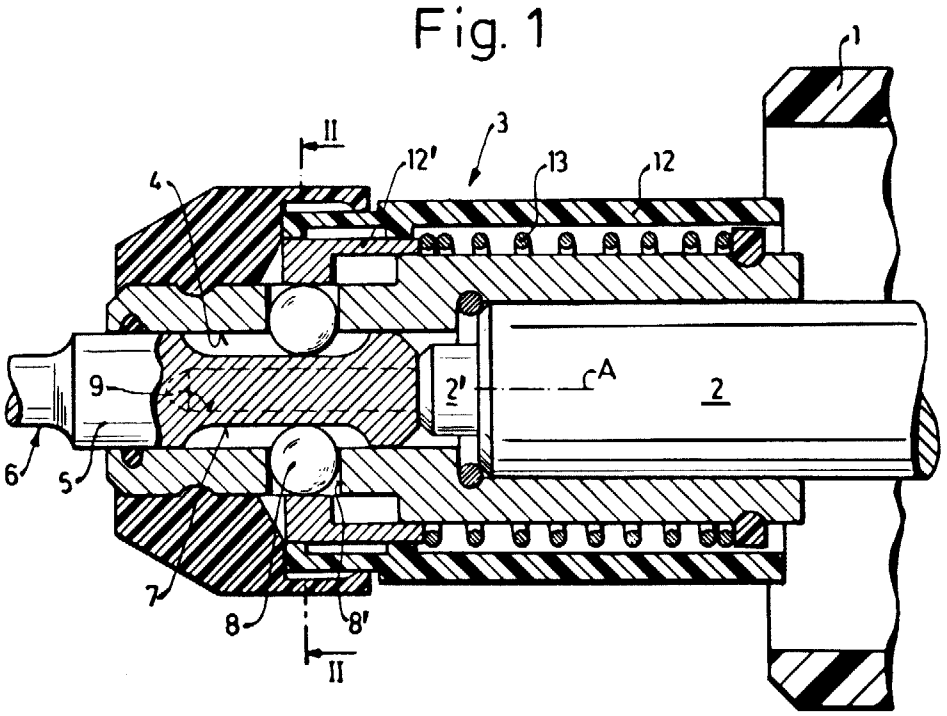
FIG. 1 is an axial section of [the combination] *a tool and a chuck* according to this invention.

As shown in FIG. 1 a hammer drill has a housing 1 with a spindle 2 defining an axis A and both rotatable about this axis A and reciprocal limitedly along this axis A. The end of the spindle 2 has a small-diameter hardened-steel extension 2' protruding axially into the rear end of a cylindrical receptacle or bore 4 formed in a chuck 3. A tool 6 has a shank 5 defining an axis coaxial with the axis A and abutting on its rear end against the extension 2'. In addition the chuck 3 is provided with a pair of diametrically opposite balls 8 engageable through radially extending holes 8' and pressable by means of a collar 12' carried on a sleeve 12 into corresponding recesses 7 in the shank 5. A spring 13 biases the sleeve 12 and collar 12' forwardly, but when pulled backwardly these balls 8 can move out of the recesses 7 so as to allow the tool 6 to be axially withdrawn from the receptacle 4.

Figure 2:
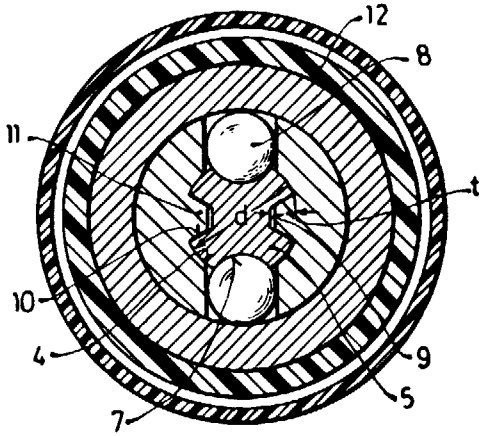
FIG. 2 is a section taken along line II—II of FIG. 1.

As better shown in FIG. 2 the chuck 3 is formed with a pair of diametrically opposite trapezoidal-section ridges 11 engageable in corresponding shaped grooves 9 formed in diametrically opposite sides of the shank 5 at locations 90° offset from the recesses 7.

The cylindrical shank 5 has a diameter d and the grooves 9 have a depth t equal to between 0.15 and 0.25 d, preferably 0.20 d. In this arrangement the diameter d is equal to 10 mm and t is therefore equal to 2.0 mm.

With the arrangement shown each of the flanks 10 lies in a respective plane including the axis A so that force transmission between the ridges [10] *11* and the grooves 9 is effected along surfaces extending perfectly perpendicular to the direction that the force is exerted. In addition FIG. 1 shows how the groove 9 is of the same axial length as the ridge 11, insuring a long surface for force transmission between these two formations.

Figure 3:
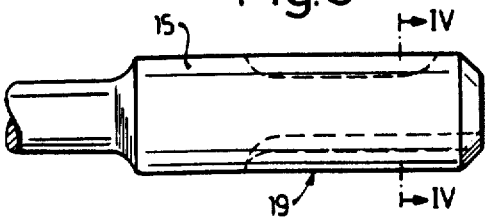
FIG. 3 is a side view of a second tool according to this invention.
Figure 4:
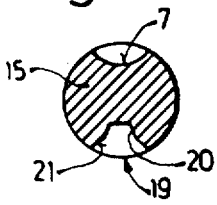
FIG. 4 is a section taken along line IV—IV of FIG. 3.

The arrangement shown in FIGS. 3 and 4 is for use with workpieces having shanks 5 with a diameter d equal to more than 10 mm. In this arrangement the recess 7 is identical to that shown in FIGS. 1 and 2, but on the opposite side there is formed a force-transmitting groove 19 with adjacent its base planar flanks 20 identical in function to the flanks 10, but also formed with part-cylindrical surfaces 21 of the same radius of curvature as the recess 7. The dpeth t of the groove 19 is once again equal to 0.2 d. This arrangement can use a ball as shown in FIGS. 1 and 2 or a cylindrical roller with ball-shaped ends to secure it in the chuck 3.

The advantage of the arrangement shown in FIGS. 3 and 4 is that the edges of the recess 19 are substantially less sensitive to damage, so that the corresponding formation 11 will always fit snugly into the groove 19 flatly against the faces 20 thereof.

Figure 5:
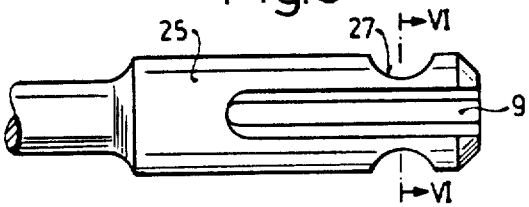
FIG. 5 is a view corresponding to FIG. 3 of a third tool according to this invention.
Figure 6:
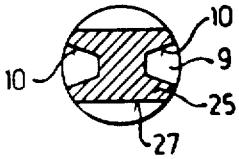
FIG. 6 is a section taken along line VI—VI of FIG. 5.

In FIGS. 5 and 6 a shank 35 is shown which is formed with a pair of diametrically opposite part-cylindrical recesses 27 centered on axes spaced from the shank 25 and lying in a plane perpendicular to the axis A thereof. It is also possible in this arrangement to form the grooves 9 similarly to the grooves 19 of FIGS. 3 and 4.

Figure 7:
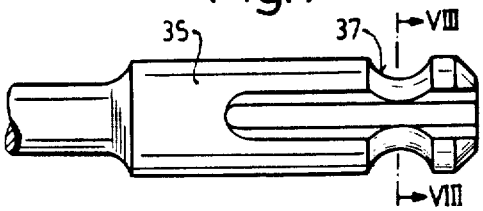
FIG. 7 is a view similar to FIG. 4 of a fourth tool according to this invention.
Figure 8:
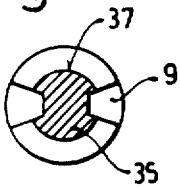
FIG. 8 is a section taken on line VIII—VIII of FIG. 7.

In FIG. 7 a tool shank 35 is shown having a part-cylindrical section circumferential groove 37 adapted to receive the balls 8 and extending completely around the shank 35. This groove 37 is of a depth less than the depth of the grooves 9. This arrangement is, once again, provided with two torque-transmitting grooves 9 of trapezoidal section. Such an arrangement is able to transmit considerable rotational forces between the chuck and the shank 35. It is also possible in this arrangement to provide two further grooves 9 offset by 90° to the grooves 9 shown in FIG. 4 so that four formations can be used to transmit force between the chuck 3 and the shank 35.

Figure 9:
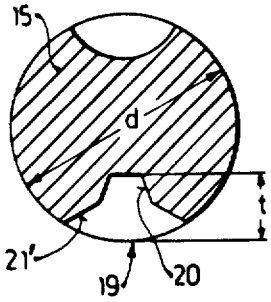
FIGS. 9, 10 and 11 are cross sections through further tool shanks according to the present invention.

The arrangement shown in FIG. 9 is identical to that shown in FIGS. 3 and 4 except that here surfaces 21 are provided which are planar rather than part-cylindrical.

Figure 10:
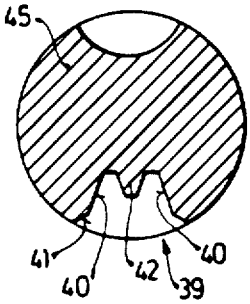

In FIG. 10 a shank 45 is shown which has on one side a recess identical to the recess 7 and on the other side a recess 39 formed as two trapezoidal-section grooves having outer flanks 40 and separated by an intermediate ridge 42 that does not extend all the way out to the outer circumference of the shank 45. In addition, the flanks 40 are beveled off at 41 much as shown in FIG. 9 so that slight damage to the outer part of the shank 45 will not prevent a correspondingly shaped ridge from fitting into the double groove 39 snugly in contact with the intermediate ridge 42 and flanks 40 thereof.

Figure 11:
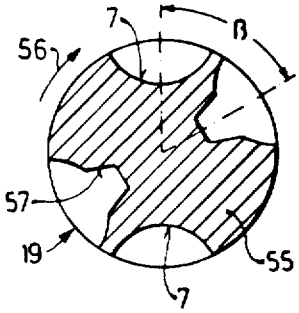

Finally, FIG. 11 shows a shank 55 which is adapted to be rotated in a direction 56. This shank 55 is formed with a pair of diametrically opposite recesses 7 and a pair of diametrically opposite recesses 19 identical to those shown in FIGS. 3 and 4 and having surfaces 57 corresponding to the surface 20 in FIGS. 3 and 4. In this arrangement, however, each of the grooves 19 lies in the direction of rotation 56 at an angle $\alpha$ offset from the corresponding recess 7. This angle $\alpha$ is equal to 60° and ensures that relatively wide webs are provided on the bearing sides of the grooves 19 for maximum force transmission between the chuck 3 and the shank 55. Such an arrangement has been found to have an extremely long service life and to be able to transmit enormous torque.

With the tools according to the present invention it is therefore possible to obtain a service life which is a multiple of the service life normally obtained by bits in a hammer drill. Indeed it is possible to use the tool until its working end is completely worn away, whereas in normal situations the shank often wore out before the working tip did.

It will be understood that each of the elements described above, or two or more together, may also find a useful application in other types of structure differing from the types described above.

While the invention has been illustrated and described as embodied in a hammer-drill arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a combination with a chuck having a tool receptacle defining a chuck axis, a rotary and impact tool having a shank defining a tool axis and receivable in said receptacle; cooperating means on said shank and said receptacle for retaining said tool in said receptacle against extraction therefrom while permitting axial displacement of the tool relative to the receptacle so that the tool can transmit axial impact to a workpiece; and means separate from said cooperating means and operative for transmitting torque between said chuck and said tool, including an axially extending groove separate and circumferentially spaced from said cooperating means, said groove being axially open at the end of said shank and having at least one flank extending substantially radially of said tool axis, said torque transmitting means further including a rotary-entrainment formation in said receptacle formed with at least one side flatly engageable with said flank.

2. The combination defined in claim 1 wherein said groove has a pair of such flanks both being coplanar with said tool axis.

3. The combination defined in claim 2 wherein said formation has an axial length substantially equal to the axial length of said groove.

4. The combination as defined in claim 1, wherein said cooperating means includes a radially outwardly opening recess formed in said shank and closed at both axial ends of said recess, and a tool-holding element radially displaceable into a position protruding into said receptacle so as to be received into said recess.

5. The combination defined in claim 4 wherein said shank is of regular section, said recess extending circumferentially completely around said shank and through said groove.

6. The combination defined in claim 4 wherein said shank is generally cylindrical and has a predetermined diameter, said groove having a radial depth equal to between three-twentieths and one-quarter of said diameter.

7. The combination defined in claim 4 wherein said groove and said recess lie on diametrically opposite sides of said tool axis.

8. The combination defined in claim 4 wherein said tool-holding element has a round inner end and said recess is similarly of rounded shape complementary to that of said inner end.

9. The combination defined in claim 4 wherein said shank is formed with two such recesses on diagonally opposite sides and with two such grooves also on diagonally opposite sides but angularly offset from said recesses.

10. The combination defined in claim 9 wherein said grooves are offset angularly relative to said tool axis from said recesses by between 45° and 90°.

11. The combination defined in claim 1 wherein said groove is of prismatic shape.

12. The combination defined in claim 11 wherein said shank has two such grooves on diagonally opposite sides.

13. The combination defined in claim 11 wherein said recess is of part-cylindrical shape and said groove is formed in the base of said recess.

14. In a power tool, a combination comprising a chuck having a tool receptacle defining a chuck axis; a rotary and impact tool having a shank defining a tool axis and being receivable in said receptacle; cooperating means on said shank and said receptacle for retaining said tool in said receptacle against extraction therefrom while permitting axial displacement of the tool relative to the receptacle so that the tool can transmit axial impact to a workpiece; and means separate from said cooperating means and operative for transmitting torque between said chuck and said tool, including an axially extending groove separate and circumferentially spaced from said cooperating means, said groove being axially open at the end of said shank and having at least one flank extending substantially radially of said tool axis, said means further including a rotary-entrainment formation in said receptacle formed with at least one side flatly engageable with said flank.

*15. A rotary and impact tool for the use with a chuck having a tool receptacle, a first formation in the receptacle and a projection in the receptacle separate from the first formation, the tool comprising a shank defining a tool axis; a second formation on said shank and cooperating with the first formation of the chuck so as to form together cooperating means for retaining the tool in the receptacle of the chuck against extraction therefrom while permitting axial displacement of the tool relative to the receptacle whereby the tool can transmit axial impact to a workpiece; and an additional formation on said shank and formed as an axially extending groove which is separate and circumferentially spaced from said second formation, said groove being axially open at the end of said shank and having at least one flank extending substantially radially of said tool axis so that the projection of the chuck can engage in said groove and at least one side of the projection can flatly engage with said one flank, whereby said groove of said shank and the projection of the chuck together form means which is separate from the cooperating means and operative for transmitting torque between the chuck and the tool.*

*16. A rotary and impact tool as defined in claim 15, wherein said second formation of said shank is arranged so that it is in direct contact with the first formation of the receptacle of the chuck without interposition of additional means.*

*17. A rotary and impact tool as defined in claim 15, wherein said one flank of said groove of said shank is arranged so that it is in direct contact with the projection of the chuck without interposition of additional means.*

*18. A rotary and impact tool as defined in claim 15, wherein said second formation of said shank is formed as a concave recess which is closed at both its axial ends.*

*19. A rotary and impact tool as defined in claim 15, wherein said second formation of said shank is formed as a recess having a part-cylindrical cross section and two part-spherical axial ends.*

*20. A rotary and impact tool comprising a shank defining a tool axis; a formation on said shank allowing limited axial displacement of said shank so that the tool can transmit axial impact to a workpiece and at the same time preventing complete axial extraction of said shank from a holding structure; and an additional formation on said shank and formed as an axially extending groove which is separate and circumferentially spaced from said first-mentioned formation, said groove being axially open at the end of said shank, having at least one flank extending substantially radially of said tool axis and being operative for transmitting torque to said shank.*

*21. A rotary and impact tool as defined in claim 20, wherein said first-mentioned formation on said shank is formed as a concave recess which is closed at both its axial ends.*

*22. A rotary and impact tool as defined in claim 20, wherein said first-mentioned formation on said shank is formed as a recess having a part-cylindrical cross section and two part-spherical axial ends.*

* * * * *